(No Model.)

B. BABCOCK.
COTTON AND HAY PRESS.

No. 277,101. Patented May 8, 1883.

Witnesses:
L. C. Hills
W. B. Masson

Inventor:
Barber Babcock
by E. E. Masson
atty.

UNITED STATES PATENT OFFICE.

BARBER BABCOCK, OF BUSTI, NEW YORK.

COTTON AND HAY PRESS.

SPECIFICATION forming part of Letters Patent No. 277,101, dated May 8, 1883.

Application filed March 24, 1883. (No model.)

*To all whom it may concern:*

Be it known that I, BARBER BABCOCK, a citizen of the United States, residing at Busti, in the county of Chautauqua and State of New York, have invented certain new and useful Improvements in Cotton and Hay Presses, of which the following is a specification.

My invention relates to an improvement in that class of presses for compressing or baling hay and other substances by means of a drop-weight; and the objects of my improvements are to provide means for retaining the hay in a compressed state after the weight is removed, and also to provide means for the convenient removal of a compressed bale from the interior of the press. I attain these objects by the construction illustrated in the accompanying drawings, in which—

Figure 1:
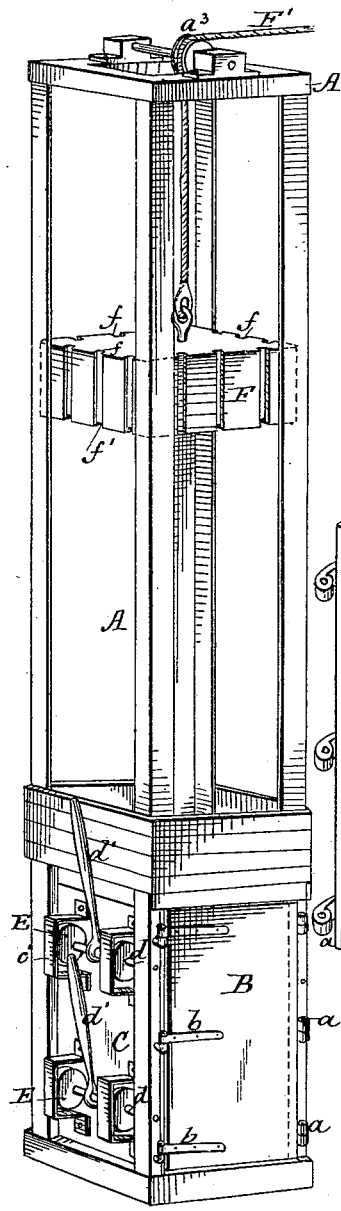
Figure 2:
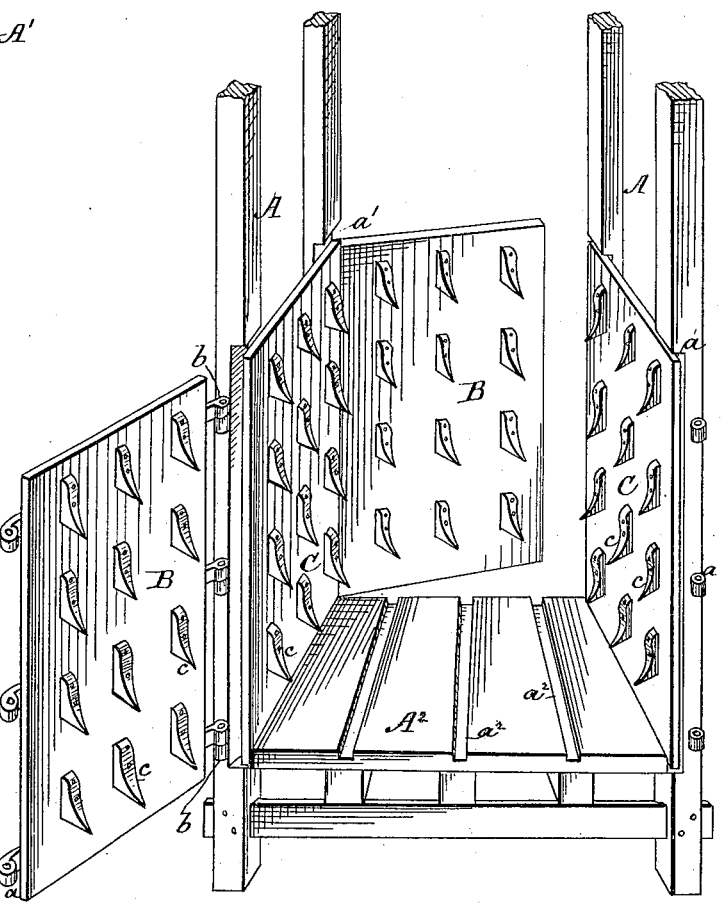
Figure 3:
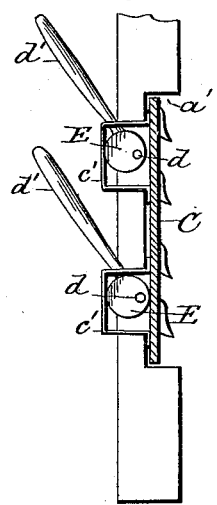

Figure 1 is a perspective view of a press constructed according to my invention. Fig. 2 is a perspective view of the lower portion of the press with the doors open to show the interior. Fig. 3 is a vertical section through one of the movable sides of the press, showing the means for moving the same.

Similar letters refer to similar parts throughout the several views.

The frame A is composed of four posts of solid timber, or made of planks united together. These posts are rigidly connected together at the top by transverse pieces A', and at the bottom by timbers upon which rests the floor $A^2$ of the press, and within the surface of said floor are grooves $a^2$, to receive the bands whereby the bale is to be tied. The two sides B of the compressing-box are hung as doors on hinges $b$, so as to be easily moved aside for the tying and removal of the bale from said box. The edge of each door is secured to the posts A by means of intermatching eyebolts $a$ and pins passing through them, or by other suitable locking device. The sides C are set in recesses $a'$, cut in the posts A, and either one or both of said sides are movable, to facilitate the disengagement of the bale from the barbs $c$, projecting from said sides into the compressing-box. To move either one of the sides C within the recess $a'$, the outer surface of said side is provided with two pairs of metal straps, $c'$, through which pass the shafts $d$, having their ends journaled into the posts A. Upon said shafts is placed the eccentric E, within the straps $c'$, and a handle, $d'$, is keyed or otherwise secured to each shaft, whereby the latter and the eccentrics thereon are partly rotated to move the sides C of the compressing-box even with the inner edge of the posts when the press is to be loaded, or to move them back within the recesses $a'$ to free the bale from the barbs $c$ when the latter is to be removed from the press. The drop-weight F has vertical grooves $f$ in its four sides to escape the rows of barbs $c$ in its descent, and grooves $f'$ in the under surface thereof, corresponding with the grooves $a^2$ in the floor of the press, for the passage of the bale-ties. The weight is elevated by means of a rope, F', passing over a pulley, $a^3$, mounted upon a shaft on top of the frame A'.

To compress hay or other material with this press, the swinging sides B are kept closed and locked, and the movable side or sides C are advanced toward the interior of the press by depressing the levers $d'$, operating upon the eccentric E. The weight F is then elevated, if not done previously, and a portion of the hay or other material to be compressed is placed in the box, and the weight F is dropped thereon from the top of the frame, compressing the material, which is retained in its compressed condition by the retaining-barbs $c$, and while the weight is again raised to the top of the frame another portion of the loose material is placed in the box and the weight let fall thereon, and so on until a sufficient quantity of material has been compressed to form a bale, and while the weight is resting thereon the bale is tied. The weight is then hoisted and the movable side or sides C withdrawn within the recesses $a'$ by elevating the levers $d'$, the eccentric E bearing against the interior of the straps $c'$. The barbs $c$ are thus withdrawn from contact with the bale, and the latter is free to be removed from the press.

Having now fully described my invention, what I claim as new, and desire to secure by Letters Patent, is—

1. The drop-weight F, having grooves $f$ in the four sides thereof and in its under face, in combination with a press-box having its two sides and doors provided with rows of barbs permanently secured thereto, substantially as and for the purpose described.

2. In combination with a drop-weight and the frame of a press, having recesses $a'$ therein, the movable side C, provided with rows of barbs, substantially as and for the purpose described.

3. The combination of a drop-weight and the frame of a press, having recesses $a'$ therein, with the movable side provided with rows of barbs, straps $c'$, secured to said sides, and eccentric E therein, substantially as and for the purpose set forth.

In testimony whereof I affix my signature in presence of two witnesses.

BARBER BABCOCK.

Witnesses:
 JAMES I. FOWLER,
 JAMES L. WEEKS.